(12) United States Patent
Carruthers et al.

(10) Patent No.: US 8,562,937 B2
(45) Date of Patent: Oct. 22, 2013

(54) PRODUCTION OF CARBON NANOTUBES

(75) Inventors: J. Donald Carruthers, Fairfield, CT (US); Xueping Xu, Stamford, CT (US); Luping Wang, Brookfield, CT (US)

(73) Assignee: Nantero Inc., Woburn, MA (US)

( * ) Notice: Subject to any disclaimer, the term of this patent is extended or adjusted under 35 U.S.C. 154(b) by 486 days.

(21) Appl. No.: 12/158,318

(22) PCT Filed: Dec. 19, 2006

(86) PCT No.: PCT/US2006/048371
§ 371 (c)(1),
(2), (4) Date: Oct. 2, 2008

(87) PCT Pub. No.: WO2008/048313
PCT Pub. Date: Apr. 24, 2008

(65) Prior Publication Data
US 2009/0099016 A1 Apr. 16, 2009

Related U.S. Application Data

(60) Provisional application No. 60/751,738, filed on Dec. 19, 2005.

(51) Int. Cl.
*D01F 9/127* (2006.01)
*D01F 9/12* (2006.01)

(52) U.S. Cl.
USPC ..................... 423/447.7; 423/447.3

(58) Field of Classification Search
USPC ................ 427/447.1, 447.2, 447.3; 977/750; 423/447.1, 447.2, 447.3, 447.7
See application file for complete search history.

(56) References Cited

U.S. PATENT DOCUMENTS

| 4,618,413 A | 10/1986 | Overfield |
| 6,057,637 A | 5/2000 | Zettl et al. |
| 6,187,823 B1 | 2/2001 | Haddon et al. |

(Continued)

FOREIGN PATENT DOCUMENTS

| DE | 2364933 A | 2/2002 |
| EP | 0947466 A1 | 6/1999 |

(Continued)

OTHER PUBLICATIONS

Afre et al. "Growth of vertically aligned carbon nanotubes on silicon and quartz substrate by spray pyrolysis of a natural precursor: Turpentine oil", Aug. 2005, Chemical Physics letters, vol. 414, p. 6-10.*

(Continued)

*Primary Examiner* — Wayne Langel
*Assistant Examiner* — Syed Iqbal
(74) *Attorney, Agent, or Firm* — Nantero Inc.

(57) ABSTRACT

A method and apparatus for manufacture of carbon nanotubes, in which a substrate is contacted with a hydrocarbonaceous feedstock containing a catalytically effective metal to deposit the feedstock on the substrate, followed by oxidation of the deposited feedstock to remove hydrocarbonaceous and carbonaceous components from the substrate, while retaining the catalytically effective metal thereon, and contacting of the substrate having retained catalytically effective metal thereon with a carbon source material to grow carbon nanotubes on the substrate. The manufacture can be carried out with a petroleum feedstock such as an oil refining atmospheric tower residue, to produce carbon nanotubes in high volume at low cost. Also disclosed is a composite including porous material having single-walled carbon nanotubes in pores thereof.

26 Claims, 9 Drawing Sheets

(56) References Cited

U.S. PATENT DOCUMENTS

| | | |
|---|---|---|
| 6,277,318 B1 | 8/2001 | Bower et al. |
| 6,331,262 B1 | 12/2001 | Haddon et al. |
| 6,342,276 B1 | 1/2002 | You et al. |
| 6,368,569 B1 | 4/2002 | Haddon et al. |
| 6,409,567 B1 | 6/2002 | Amey, Jr. et al. |
| 6,423,583 B1 | 7/2002 | Avouris et al. |
| 6,495,116 B1 | 12/2002 | Herman |
| 6,495,258 B1 | 12/2002 | Chen et al. |
| 6,515,339 B2 | 2/2003 | Shin |
| 6,528,020 B1 | 3/2003 | Dai et al. |
| 6,531,513 B2 | 3/2003 | Haddon et al. |
| 6,630,772 B1 | 10/2003 | Bower et al. |
| 6,641,793 B2 | 11/2003 | Haddon et al. |
| 6,645,628 B2 | 11/2003 | Shiffler, Jr. et al. |
| 6,706,402 B2 | 3/2004 | Rueckes et al. |
| 6,707,098 B2 | 3/2004 | Hofmann et al. |
| 6,752,977 B2 | 6/2004 | Smalley et al. |
| 6,808,746 B1 | 10/2004 | Dai et al. |
| 6,833,558 B2 | 12/2004 | Lee et al. |
| 6,858,197 B1 | 2/2005 | Delzeit |
| 6,863,942 B2 | 3/2005 | Ren et al. |
| 6,896,864 B2 | 5/2005 | Clarke |
| 6,899,945 B2 | 5/2005 | Smalley et al. |
| 6,918,284 B2 | 7/2005 | Snow et al. |
| 6,919,592 B2 | 7/2005 | Segal et al. |
| 6,919,740 B2 | 7/2005 | Snider |
| 6,921,575 B2 | 7/2005 | Horiuchi et al. |
| 6,924,538 B2 | 8/2005 | Jaiprakash et al. |
| 6,946,410 B2 | 9/2005 | French et al. |
| 7,057,402 B2 | 6/2006 | Cole et al. |
| 7,115,864 B2 | 10/2006 | Colbert et al. |
| 7,566,478 B2 | 7/2009 | Ward et al. |
| 2001/0004979 A1 | 6/2001 | Han et al. |
| 2002/0081380 A1 | 6/2002 | Dillon et al. |
| 2002/0160111 A1 | 10/2002 | Sun et al. |
| 2003/0004058 A1 | 1/2003 | Li et al. |
| 2003/0065206 A1 | 4/2003 | Bolskar et al. |
| 2003/0122111 A1 | 7/2003 | Glatkowski |
| 2003/0177450 A1 | 9/2003 | Nugent |
| 2003/0200521 A1 | 10/2003 | DeHon et al. |
| 2003/0220518 A1 | 11/2003 | Bolskar et al. |
| 2004/0005723 A1 | 1/2004 | Empedocles et al. |
| 2004/0007528 A1 | 1/2004 | Bakajin et al. |
| 2004/0023253 A1 | 2/2004 | Kunwar et al. |
| 2004/0023514 A1 | 2/2004 | Moriya et al. |
| 2004/0031975 A1 | 2/2004 | Kern et al. |
| 2004/0034177 A1 | 2/2004 | Chen |
| 2004/0041154 A1 | 3/2004 | Watanabe et al. |
| 2004/0043527 A1 | 3/2004 | Bradley et al. |
| 2004/0071949 A1 | 4/2004 | Glatkowski et al. |
| 2004/0099438 A1 | 5/2004 | Arthur et al. |
| 2004/0104129 A1 | 6/2004 | Gu et al. |
| 2004/0181630 A1 | 9/2004 | Jaiprakash et al. |
| 2004/0247896 A1 | 12/2004 | Apen et al. |
| 2004/0253167 A1* | 12/2004 | Silva et al. ............... 423/447.1 |
| 2004/0265550 A1 | 12/2004 | Glatkowski et al. |
| 2005/0053525 A1 | 3/2005 | Segal et al. |
| 2005/0058797 A1 | 3/2005 | Sen et al. |
| 2005/0065741 A1 | 3/2005 | Segal et al. |
| 2005/0095938 A1 | 5/2005 | Rosenberger et al. |
| 2005/0237537 A1 | 10/2005 | Leizerson et al. |
| 2005/0260453 A1 | 11/2005 | Jiao et al. |
| 2005/0269554 A1 | 12/2005 | Sen et al. |
| 2006/0052509 A1 | 3/2006 | Saitoh |
| 2006/0204427 A1 | 9/2006 | Ghenciu et al. |
| 2006/0237537 A1 | 10/2006 | Empedocles et al. |
| 2007/0004191 A1 | 1/2007 | Gu et al. |
| 2008/0089828 A1* | 4/2008 | Soga et al. ............... 423/447.2 |
| 2009/0087630 A1* | 4/2009 | Ward et al. ............... 428/206 |

FOREIGN PATENT DOCUMENTS

| | | | |
|---|---|---|---|
| EP | 1061040 A1 | | 12/2000 |
| JP | 2000203821 | | 7/2000 |
| JP | 2001035362 A | | 2/2001 |
| JP | 2004026626 A | * | 1/2004 |
| JP | 2004090208 A | | 3/2004 |
| WO | WO-98/39250 A1 | | 9/1998 |
| WO | WO-99/65821 A1 | | 12/1999 |
| WO | WO-00/17101 A1 | | 3/2000 |
| WO | WO-01/03208 A1 | | 1/2001 |
| WO | WO-02/45113 | | 6/2002 |
| WO | WO-02/48701 A1 | | 6/2002 |
| WO | WO-02/060812 A2 | | 8/2002 |
| WO | WO-03/016901 A1 | | 2/2003 |
| WO | WO-03/022733 A2 | | 3/2003 |
| WO | WO-03/034142 A1 | | 4/2003 |
| WO | WO-03/091486 A1 | | 11/2003 |
| WO | WO-2004/039893 A1 | | 5/2004 |
| WO | WO-2004/065655 A1 | | 8/2004 |
| WO | WO-2004/065671 A1 | | 8/2004 |
| WO | WO-2004065657 A1 | | 8/2004 |
| WO | 2005085130 A2 | | 9/2005 |
| WO | WO-2006/078293 A2 | | 7/2006 |
| WO | WO-2008/048313 | | 4/2008 |

OTHER PUBLICATIONS

Pradhan et al. "Carbon nanotubes, nanofilaments and nanobeads by thermal chemical vapor deposition process", 2002, Materials Science Engineering B 96, 24-28.*

Fei et al. "Production of Carbon Nanotubes in a Packed Bed and a Fluidized Bed", 2003, AICHE Journal, vol. 49 No. 3, 619-625.*

Kibria et al. "Synthesis of Carbon nanotubes over nickel-iron catalysts supportedon alumina under controlled conditions", 2000, Catalysis Letters, vol. 71, No. 3-4, p. 229-236.*

Seitz et al. "The Role of NonPolar Oils as Flotation Reagents", 1986, p. 171-179.*

Chatterjee, A.K., et al., "CVD synthesis of carbon nanotubes using a finely dispersed cobalt catalyst and their use in double layer . . . ", "Electrochimica Acta", 2003, pp. 3439-3446, vol. 48.

Kibria, A.K.M. Fazle, et al., "Synthesis of carbon nanotubes over nickel-iron catalysts supported on alumina under controlled conditions", "Catalysis Letters", 2001, pp. 229-236, vol. 71, No. 3-4, Publisher: Plenum Publishing Corporation.

Xu, Mingcan, et al., "Growth of zeolite KSO1 on calcined kaolin microspheres", "J. Mater. Chem.", 1999, pp. 2965-2966, vol. 9, Publisher: The Royal Society of Chemistry.

Chiang, et al., "Purification and Characterization of Single-Wall Carbon Nanotubes (SWNTs) Obtained from the Gas-Phase Decomposition of CO (HiPco Process)," J. Phys. Chem., B, 2001, 105, pp. 8297-8301.

Fazle Kibria, et al., "Synthesis of Narrow-Diameter Carbon Nanotubes from Acetylene Decomposition Over an Iron-Nickel Catalyst Supported on Alumina," Carbon, 40, 2002, pp. 1241-1247.

International Search Report and Written Opinion of the International Searching Authority, the United States Patent and Trademark Office, for International Application No. PCT/US06/48371, dated May 31, 2008, 10 pages.

International Search Report and Written Opinion of the International Searching Authority, the United States Patent and Trademark Office, for Internationall Application No. PCT/US2005/018467, dated Oct. 1, 2007, 4 pages.

Supplementary European Search Report and Written Opinion for Application No. EP06851793, dated Jul. 10, 2009, 9 pages.

Hou, "Multi-Step Purification of Carbon Nanotubes," Carbon 40 (2002), pp. 81-85.

International Search Report and Written Opinion of the International Searching Authority for PCT/US05/18467 dated Oct. 1, 2007, 5 pages.

International Search Report for PCT/US05/17839 dated Aug. 10, 2006, 1 page.

International Search Report for PCT/US05/18465 dated Aug. 21, 2006, 3 pages.

International Search Report for PCT/US05/18539 dated Sep. 18, 2006, 4 pages.

International Search Report for PCT/US05/18600 dated Aug. 3, 2006, 1 page.

(56) References Cited

OTHER PUBLICATIONS

International Search Report for PCT/US05/45316 dated Sep. 6, 2006, 2 pages.
Islam, "High Weight Fraction Surfactant Solubilization of Single-Wall Carbon Nanotubes in Water," Nano Letters, 2003, vol. 3, No. 2, pp. 269-273.
Jeong, "A new purification method of single-wall carbon nanotubes using H2S and O2 misture gas," Chemical Physics Letters 344 (2001), pp. 18-22.
Johnson, "IBM Grows Nanotube Patterns on Silicon Wafers," EETimes, Sep. 30, 2002, URL: http://www.eetimes.com/article/showArticle.jhtml?articleID=18307520, 1 page.
Joselevich, "Vectorial Growth of Metallic and Semiconducting Single-Wall Carbon Nanotubes," Nano Letters, 2002, vol. 0, No. 0, pp. A-E.
Kahn, "Solubilization of Oxidized Single-Walled Carbon Nanotubes in Organic and Aqueous Solvents through Organic Derivatization," Nano Letters 2002, vol. 2, No. 11, pp. 1215-1218.
Kong, "Chemical vapor deposition of methane for single-walled carbon nanotubes," Chemical Physics Letters 292 (1998), pp. 567-574, 1 page.
Kong, "Nanotube Molecular Wires as Chemical Sensors," Science, vol. 287, Jan. 28, 2000, pp. 622-625.
Li, "Carbon Nanotube Nanoelectrode Array for Ultrasensitive DNA Detection," American Chemical Society, 2003, vol. 3, No. 5, pp. 597-602.
Li, "Growth of Single-Walled Carbon Nanotubes from Discrete Catalytic Nanoparticles of Various Sizes," J. Phys. Chem. B 2001, 105, pp. 11424-11431.
Li, Preparation of Monodispersed Fe-Mo Nanoparticles as the Catalyst for CVD Synthesis of Carbon Nanotubes, Chem. Mater, 2001, 13, pp. 1008-1014.
Martinez, "Modifications of Single-Wall Carbon Nanotubes Upon Oxidative Purification Treatments," Institute of Physics Publishing, Nanotechnology 14 (2003), pp. 691-695.
Matarredona, "Dispersion of Single-Walled Carbon Nanotubes in Aqueous Solutions of the Anionic Surfactant NaDDBS," J. Phys. Chem. B 2003, 107 pp. 13357-13367.
Mickelson, "Solvation of Fluorinated Single-Wall Carbon Nanotubes in Alcohol Solvents," J. Phys. Chem. B 1999, 103, pp. 4318-4322.
Moore, "Individually Suspended Single-Walled Carbon Nanotubes in Various Surfactants," Nano Letters 2003, vol. 3, No. 10, pp. 1379-1382.
Murphy, "High-Yield, Nondestructive Purification and Quantification Method for Multiwalled Carbon Nanotubes," J. Phys. Chem. B 2002, 106, pp. 3087-3091.
Nerushev, "Carbon Nanotube Films Obtained by Thermal Chemical Vapour Deposition," Journal of Materials Chemistry, 2001, 11, pp. 1122-1132.
Niu, "High Power Electrochemical Capacitors Based on Carbon Nanotube Electrodes," Appl. Phys. Lett. 70 (11), Mar. 17, 1997, pp. 1480-1482.
Niyogi, "Ultrasonic Dispersions of Single-Walled Carbon Nanotubes," J. Phys. Chem. B 2003, 107, pp. 8799-8804.
O'Connell, "Reversible Water-Solubilization of Single-Walled Carbon Nanotubes by Polymer Wrapping," Chemical Physics Letters 342 (2001), pp. 265-271.
Onoa, "Bulk Production of Singly Dispersed Carbon Nanotubes with Prescribed Lengths," Institute of Physics Publishing, Nanotechnology 16 (2005), pp. 2799-2803.
Peigney, "A Study of the Formation of Single- and Double-Walled Carbon Nanotubes by a CVD Method," J. Phys. Chem. B 2001, 105, pp. 9699-9710.
Pompeo, "Water Solubilization of Single-Walled Carbon Nanotubes by Functionalization with Glucosamine," Nano Letters 2002, vol. 2, No. 4, pp. 369-373.
Qi, "Toward Large Arrays of Multiplex Functionalized Carbon Nanotube Sensors for Highly Sensitive and Selective Molecular Detection," Nano Letters 2003, vol. 3, No. 3, pp. 347-351.
Riggs, "Optical Limiting Properties of Suspended and Solubilized Carbon Nanotubes," J. Phys. Chem. B 2000, 104, pp. 7071-7076.
Riggs, "Strong Luminescence of Solubilized Carbon Nanotubes", J. Am. Chem. Soc. 2000, 122, pp. 5879-5880.
Rinzler, "Large-Scale Purification of Single-Wall Carbon Nanotubes: Process, Product, and Characterization," Applied Physics A 67, pp. 29-37 (1998).
Shelimov, "Purification of Single-Wall Carbon Nanotubes by Ultrasonically Assisted Filtration," Chemical Physics Letters 282 (1998) pp. 429-434.
Sotiropoulou, "Carbon Nanotube Array-Based Biosensor," Anal Bioanal Chem. (2003), 375, pp. 103-105.
Star, "Preparation and Properties of Polymer-Wrapped Single-Walled Carbon Nanotubes," Agnew Che. Int. Ed. 2001, 40, No. 9, pp. 1721-1725.
Sun, "High Dissolution and Strong Light Emission of Carbon Nanotubes in Aromatic Amine Solvents," 2001 American Chemical Society, pp. 5348-5349.
Sun, "Soluble Dendron-Functionalized Carbon Nanotubes: Preparation, Characterization, and Properties," Che. Mater, 2001, 13, pp. 2864-2869.
Tipo's Search Report for ROC Patent Application No. 094118087 (English Translation) dated Aug. 17, 2007.
Valentini, "Sensors for Sub-PPM NO2 Gas Detection based on Carbon Nanotube Thin Films," Applied Physics Letters, vol. 82, No. 6, Feb. 10, 2003, pp. 961-963.
Vivekchand, "A New Method of Preparing Single-Walled Carbon Nanotubes," Proc. Indian Acad. Sci (Chem. Sci.), vol. 115, Nos. 5 & 6, Oct.-Dec. 2003, pp. 509-518.
Zhang, "Formation of Metal Nanowires on Suspended Single-Walled Carbon Nanotubes," Applied Physics Letters, vol. 77, No. 19, Nov. 6, 2000, pp. 3015-3017.
Zhang, "Metal Coating on Suspended Carbon Nanotubes and its Implication to Metal-Tube Interaction," Chemical Physics Letters 331 (2000), pp. 35-41.
Zhang, "Select Pathways to Carbon Nanotube Film Growth," Advanced Materials, 2003, pp. 1767-1770.
Zhao, "Frequency-Dependent Electrical Transport in Carbon Nanotubes," Physical Review B., vol. 64, 2001, pp. 201402-1-201402-4.
U.S. Appl. No. 10/341,005, Ward, filed Jan. 13, 2003.
"Research-Multifunctional Nanotube Composites," http://www.ornl.gov/~odg/compositesmain.html, Jun. 10, 2004, 5 pages.
"Wondrous World of Carbon Nanotubes," Multi Disciplinair Project, Jun. 10, 2004, pp. 1-11, http://students.chem.tue.nl/ifp03/purification.html.
Ago, "Workfunction of Purified and Oxidised Carbon Nanotubes," Synthetic Metals 103 (1999) 2494-2495.
Ajayan, "Applications of Carbon Nanotubes," Topics Appl. Phys. 80, 291-425 (2001).
U.S. Appl. No. 10/341,005, Entitled Methods of Making Carbon Nanotube Films, Layers, Fabrics, Ribbons, Elements and Articles filed Jan. 13, 2003.
Ausman, "Organic Solvent Dispersions of Single-Walled Carbon Nanotubes: Toward Solutions of Pristine Nanotubes," The Journal of Physical Chemistry, vol. 104, No. 38, Sep. 28, 2000, pp. 8911-8915.
Bahr, "Dissolution of Small Diameter Single-Wall Carbon Nanotubes in Organic Solvents?," Chem. Commun, 2001, pp. 193-194.
Banerjee, "Functionalization of Carbon Nanotubes with a Metal-Containing Molecular Complex," Nano Letters 2002, vol. 2, No. 1, pp. 49-53.
Berhan, "Mechanical Properties of Nanotube Sheets: Alterations in Joint Morphology and Achievable Moduli in Manufacturable Materials," Journal of Applied Physics, vol. 95, No. 8, Apr. 15, 2004, pp. 4335-4345.
Bonard, "Monodisperse Multiwall Carbon Nanotubes Obtained with Ferritin as Catalyst," Nano Letters, 2002, vol. 2, No. 6, pp. 665-667.
Cassell, "Carbon Nanotube Networks by Chemical Vapor Deposition," Applied Physics Letters, 2003, pp. 817-819.
Cassell, "Large Scale CVD Synthesis of Single-Walled Carbon Nanotubes," J. Phys. Chem. B 1999, 103, pp. 6484-6492.

(56) References Cited

OTHER PUBLICATIONS

Chen, "Dissolution of Full-Length Single-Walled Carbon Nanotubes," J. Phys. Chem. B 2001, 105, pp. 2525-2528.

Chen, "Heterogeneous Single-Walled Carbon Nanotube Catalyst Discovery and Optimization," Chem. Matter, 2002, 14, pp. 1891-1896.

Chen, "Noncovalent Sidewall Functionalization of Single-Walled Carbon Nanotubes for Protein Immobilization," J. Am. Chem. Soc. 2001, 123, pp. 3838-3839.

Chen, "Solution Properties of Single-Walled Carbon Nanotubes," Science, vol. 282, Oct. 2, 1998, pp. 95-98.

Cheng, "Large-scale and low-cost synthesis of single-walled carbon nanotubes by the catalytic pyrolysis of hydrocarbons," Applied Physics Letters, vol. 72, No. 25, Jun. 22, 1998, pp. 3282-3284.

Chiang, "Purification and Characterization of Single-Wall Carbon Nanotubes," J. Phys. Chem. B, 2001, 105, pp. 1157-1161.

Colomer, "Different Purification Methods of Carbon Nanotubes Produced by Catalytic Synthesis," Synthetic Metals 103 (1999), pp. 2482-2483.

Dai, "Controlled Chemical Routes to Nanotube Architectures, Physics, and Devices," J. Phys. Chem. B 1999, 103, pp. 11246-11255.

Delzeit, "Multilayered metal catalysts for controlling the density of single-walled carbon nanotube growth," Chemical Physics Letters 348 (2001), pp. 368-374.

Desai, "Freestanding Carbon Nanotube Specimen Fabrication," IEEE Conference on Nanotechnology, Jul. 2005, Japan, 4 pages.

Dillon, "A Simple and Complete Purification of Single-Walled Carbon Nanotube Materials," Advanced Materials 1999, 11, No. 16, pp. 1354-1359.

Franklin, "An Enhanced CVD Approach to Extensive Nanotube Networks with Directionality," Advanced Materials, pp. 890-894.

Georgakilas, "Organic Functionalization of Carbon Nanotubes," J. Am. Chem. Soc., vol. 124, No. 5, 2002, pp. 760-761.

Gromov, "Purification of Carbon Nanotubes," CARAMEL workshop, Jan. 23, 2002, 13 pages.

Haddon, "Purification and Separation of Carbon Nanotubes," MRS Bulletin, Apr. 2004, pp. 252-259.

Hafner, "Catalytic growth of single-wall carbon nanotubes from metal particles," Chemical Physics Letters 296 (1998), pp. 195-202.

Hirsch, "Functionalization of Single-Walled Carbon Nanotubes," Agnew, Chem. Int. Ed. 2002, 41, No. 11, pp. 1853-1859.

Homma, "Single-Walled Carbon Nanotube Growth on Silicon Substrates using Nanoparticle Catalysts," Applied Physics, vol. 41 (2002), pp. L89-L91.

Parikh, et al., "Flexible Vapour Sensors Using Single Walled Carbon Nanotubes," Sensors and Actuators B 113, 2006, pp. 55-63.

* cited by examiner

PRODUCTION OF CARBON NANOTUBES

CROSS-REFERENCE TO RELATED APPLICATIONS

This is a United States national phase application filed under the provisions of 35 USC §371 based on International Application No. PCT/US06/48371 filed Dec. 19, 2006, which in turn claims the benefit of priority of U.S. Provisional Patent Application No. 60/751,738 filed Dec. 19, 2005. The disclosures of such international application and U.S. priority application are hereby incorporated herein by reference in their respective entireties, for all purposes.

FIELD OF THE INVENTION

The present invention relates to the production of carbon nanotubes and to carbon nanotube/activated carbon composites.

DESCRIPTION OF THE RELATED ART

Carbon nanotubes have generated a high level of interest since their discovery, in consequence of their unique structural, electronic and mechanical properties. The potential of carbon nanotubes is particularly great in the field of microelectronics, e.g., in applications such as solid-state memory, field emission displays and switching devices.

Despite their enormous potential, an economic method of making carbon nanotubes in large scale quantities has not been developed.

Initial efforts to manufacture carbon nanotubes were focused on techniques using high voltage electric arcs, but these techniques are not scaleable, and thus are unsuitable for commercial use.

More recent efforts to develop synthesis processes for carbon nanotubes have variously employed combustion of aromatic molecules in the presence of iron carbonyls, laser ablation techniques, and chemical vapor deposition over supported metal catalysts, but all of these methods have proven to be very costly. Although combustion processes have lowered costs of carbon nanotubes to a current level on the order of $30 US per gram, from initial costs of —$1000 US per gram, the cost of carbon nanotubes is still an impediment to their widespread commercial application.

An economic large-scale synthesis method for low-cost manufacture of carbon nanotubes would therefore constitute a major advance in the field of nanotechnology.

SUMMARY OF THE INVENTION

The present invention relates to carbon nanotubes, production of carbon nanotubes, and composite materials comprising carbon nanotube and activated carbon constituents.

In one aspect, the invention relates to a method of making carbon nanotubes, comprising:
  depositing catalytically effective metal for carbon nanotube growth on a substrate to produce a catalytically effective metal-containing substrate; and
  contacting the catalytically effective metal-containing substrate with a carbon source material that in contact with such substrate enables growth of carbon nanotubes thereon, for sufficient time and under sufficient conditions to grow carbon nanotubes on the substrate.

In another aspect, the invention relates to a method of forming carbon nanotubes, comprising:
  contacting a catalytically effective metal-containing feedstock with a substrate to deposit said feedstock on the substrate;
  exposing the substrate having metal-containing feedstock thereon to elevated temperature effecting burnoff of carbon in the feedstock on the substrate and yielding a catalytic metal-containing substrate; and
  contacting the catalytic metal-containing substrate with a nanotube-forming carbon source material under conditions producing carbon nanotubes on the substrate.

In a further aspect, the invention relates to a microsphere having an array of carbon nanotubes grown thereon.

A further aspect of the invention relates to an apparatus for manufacturing carbon nanotubes, comprising:
  a first vessel adapted to contain a bed of particles therein;
  a source of a feedstock containing catalytically effective metal for forming carbon nanotubes from a carbon source material therefor, joined in feed relationship with the first vessel for flow of the feedstock through the bed of particles in the first vessel to deposit the feedstock containing catalytically effective metal on the particles;
  a source of oxidant arranged in feed relationship with the first vessel and adapted for flow of oxidant through the first bed of particles after termination of flow of feedstock therethrough, and burnoff of the feedstock to yield particles having catalytically effective metal thereon in said first vessel; and
  a second vessel adapted to contain a bed of particles containing catalytically effective metal thereon, wherein said second vessel is coupled in fluid flow relationship with the first vessel and adapted to receive fluid from the first vessel comprising flow of feedstock to contact the bed of particles in the second vessel, for growth of carbon nanotubes thereon.

A still further aspect of the invention relates to a method for manufacturing carbon nanotubes, comprising:
  contacting a substrate with hydrocarbonaceous feedstock containing a catalytically effective metal to deposit said feedstock thereon;
  oxidizing the feedstock deposited on the substrate to remove hydrocarbonaceous and carbonaceous components thereof from the substrate, but retaining the catalytically effective metal thereon; and
  contacting the substrate having retained catalytically effective metal thereon with a carbon source material to grow carbon nanotubes on the substrate.

Another aspect of the invention relates to a method of making carbon nanotubes, comprising:
  providing a substrate including metal that is catalytically effective for carbon nanotube growth on the substrate;
  contacting the catalytically effective metal-containing substrate with a carbon source material, for sufficient time and under sufficient conditions to grow carbon nanotubes on the substrate; and
  recovering the carbon nanotubes from the substrate.

The invention relates in a further aspect to a composite comprising porous material having single-walled carbon nanotubes grown in pores thereof.

Another aspect of the invention relates to a method of forming a single-walled nanotube/activated carbon composite, comprising impregnating a porous activated carbon with a catalyst precursor, reducing the catalyst precursor to form active catalyst in pores of the activated carbon, and catalytically growing single-walled carbon nanotubes in the pores of the activated carbon.

A further aspect of the invention relates to a method of forming a single-walled nanotube composite, comprising impregnating a porous substrate with a catalyst precursor, reducing the catalyst precursor to form active catalyst in pores of the substrate, and catalytically growing single-walled carbon nanotubes in the pores of the porous substrate.

Yet another aspect of the invention relates to a method of forming single-walled nanotubes in pores of a porous material, such method comprising:

(a) dissolving a metal catalyst precursor in a solvent to form a precursor solution;
(b) contacting the porous material with the precursor solution to introduce the precursor solution into the pores of the porous material;
(c) drying the porous material to remove solvent from the pores;
(d) reducing the metal catalyst in the pores of the porous material to an active metal catalyst form; and
(e) contacting the porous material with a carbon source vapor at sufficient temperature and for sufficient time to catalytically form single walled nanotubes in the pores of the porous material.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
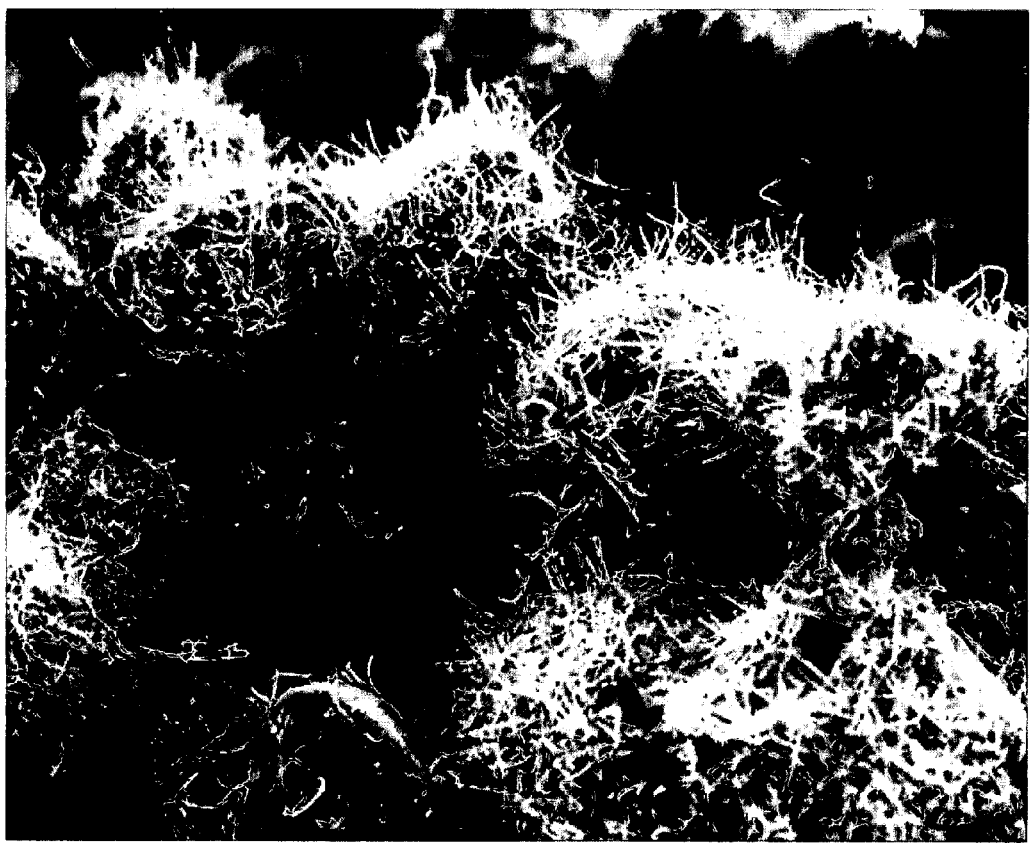
FIG. 1 is a scanning electron microscope (SEM) micrograph showing formation of carbon nanotubes on calcined kaolin microspheres, prior to fluidization and removal.

The present invention relates to carbon nanotubes, and in specific aspects to the production of carbon nanotubes, using extremely cheap raw materials and a simple synthesis procedure. The invention also relates to composite materials comprising carbon nanotube and activated carbon constituents.

The invention is based in one aspect on the discovery that carbon nanotubes can be synthesized in an efficient low-cost manner, utilizing catalytic species derived from crude oil or other suitable source, which are disposed on a support medium to provide nucleation sites for formation of carbon nanotubes.

More specifically, carbon nanotubes grow from solid surfaces when associated with the catalytic effect of nickel or iron species on vapor-phase unsaturated organics. A "bottom of the barrel" reduced crude oil contains nickel porphyrins at nickel concentrations of a few parts per million by weight (ppm wt.) nickel up to 100 ppm wt. or more. When these nickel porphyrins are deposited on support media such as inert porous matrix materials, they act as nuclei for the formation and growth of carbon nanotubes when contacted with aromatic and/or non-aromatic unsaturated oil vapors.

The support medium may be of any suitable type, and can for example include a porous medium such as silica, alumina, aluminosilicates, kielselguhr, clays, and/or macroreticulate polymer. The support medium may be of any suitable morphological or structural form, but preferably is in the form of finely divided particles or other discontinuous form, most preferably microparticles such as microspheres, microflakes, microrods, etc. In one embodiment, the support medium includes an inert silica-alumina matrix, such as calcined kaolin microspheres.

In one embodiment, the support medium includes spent fluid catalytic cracking (FCC) catalyst. Such material may for example include a zeolitic matrix in which the zeolite has degraded, e.g., structurally collapsed.

The raw material for nanotube manufacture in the process of the invention may be of any suitable type, and preferably is a hydrocarbon material containing at least one unsaturated hydrocarbon that is volatilizable to form a corresponding hydrocarbon vapor for contacting with the catalytic species for carbon nanotubes formation. The unsaturated hydrocarbon can be aromatic or non-aromatic in character, including for example $C_1$-$C_{20}$ unsaturated hydrocarbons, including alkenes, alkynes, cycloalkenes, cycloalkynes, aryls, arylalkyls, alkaryls, and may contain one or a mixture (e.g., a mixture of ethylene, propane, butane, octane, benzene, naphthalene, toluene, xylene, etc.) of unsaturated species. In one embodiment, the raw material is a petroleum feedstock, such as a residual oil feedstock (e.g., atmospheric tower residue) produced in commercial oil refining operations.

Residual oil feedstock useful as raw material for carbon nanotubes synthesis may be of any suitable type. Preferred characteristics of the residual oil feedstock include:

| | |
|---|---|
| Specific Gravity: | 9-24 degrees API (degrees API Gravity scale, American Petroleum Institute standard) |

-continued

| | |
|---|---|
| Ramsbottom Carbon Content: | 2-20 wt. % |
| Nickel Content: | 10-70 ppm wt. |
| Vanadium Content: | 10-150 ppm wt. |
| Iron: | 0-50 ppm wt. |
| Distillation | |
| 50% Fraction: | 400-550° C. |

An illustrative residual oil feedstock useful as raw material for carbon nanotubes synthesis may for example have the following properties:

| | |
|---|---|
| Specific gravity: | 23.0 degrees API |
| Ramsbottom carbon content: | 2.5 wt. % |
| Nickel content: | 10 ppm wt. |
| Vanadium content: | 20 ppm wt. |

Distillation boiling point fractionation profile:

| Initial boiling point 216° C. | |
|---|---|
| Fraction | Temperature |
| 10% | 248° C. |
| 30% | 377° C. |
| 50% | 443° C. |
| 70% | 526° C. |
| 76% | 563° C. |

Carbon nanotubes may be formed from a catalytic metal-containing feedstock of such type by contacting the feedstock with a substrate, i.e., a support medium, for sufficient time and at appropriate conditions (temperature, pressure, flow rate, etc.) to deposit catalytic metal-containing feedstock on the support medium. The support medium having metal-containing feedstock thereon then is subjected to sufficient elevated temperature for sufficient time to effect burnoff of carbon in the feedstock on the substrate, and yield a catalytic metal-containing substrate.

The catalytic metal-containing substrate next is contacted with a nanotube-forming carbon source material for sufficient time and under sufficient process conditions to catalytically grow carbon nanotubes on the surface of the substrate. The nanotube-forming carbon source material may be the same as or different from the catalytic metal-containing feedstock initially employed, or a metal-depleted form of such initial feedstock. In one embodiment, the nanotube-forming carbon source material may be the same feedstock after initial contacting thereof to deposit catalytic metal-containing feedstock on the support medium, so that the initial contacting for deposition of catalytic metal on the support medium, and the second contacting for carbon nanotubes growth, are conducted as serial steps of a carbon nanotubes manufacturing process.

The contacting steps may be carried out in a continuous, batch, semi-batch, or other mode of processing appropriate to the specific implementation of the manufacturing operation. Suitable process conditions for such contacting steps can be readily determined within the skill of the art, based on the disclosure herein.

For example, the first contacting step to deposit catalytically effective metal on the substrate can be carried out at temperature in a range of from about 480° C. to about 750° C., more preferably in a range of from about 510° C. to about 710° C. and still more preferably in a range of from about 520° C. to about 650° C. and most preferably in a range of from 526° C. to about 620° C., and pressure in a range of 15 to 50 psig, with flow rates (represented as weight hourly space velocity, WHSV, the weight of oil in kg per weight of solid, in units of kg per hour) in a range of from 5 to 20 kg/hour for a contacting vessel in which the feedstock has a typical residence time in a range of from 0.5 to 144 seconds, e.g., in a range of from 0.5 to 10 seconds.

The feedstock contacting can be advantageously carried out in a reactor operated as a fluidized bed reactor, through which the feedstock is flowed as the fluidizing medium, at a sufficient superficial velocity to effect fluidization of the substrate (provided for such purpose as a bed of discontinuous particles), with minimum bypassing or other anomalous flow behavior.

Subsequent to the deposition of catalytically effective metal (taken herein as referring to metal that is catalytically effective for growth of carbon nanotubes in the presence of a carbon source material), the substrate having the catalytic metal-containing feedstock thereon is subjected to carbon burn-off under oxidizing conditions, to combust the feedstock and yield the substrate having the catalytically effective metal thereon.

The carbon burn-off step can be carried out at any suitable temperature, and may for example be carried out in a range of from about 550° C. to about 870° C., with preferred carbon burn-off temperatures being in a range of from about 650° C. to about 815° C., more preferably in a range of from about 690° C. to about 770° C. and most preferably a temperature in the vicinity of about 720° C. The carbon burn-off step in one embodiment are conducted at pressure in a range of 5 to 50 psig, more preferably in a range of from about 8 to about 10 psig, at gas flow rates in a range of from 1 to 10 standard cubic feet per minute (CFM) per kilogram of solid in a contacting vessel in which the oxidizing medium can for example have a residence time in a range of from about 5 to about 30, more preferably in a range of from about 5 to about 20 and still more preferably in a range of from about 5 to about 10 minutes.

The oxidizing conditions may include contacting the substrate having the catalytic metal-containing feedstock thereon with an oxidant gas, such as carbon monoxide, carbon dioxide, oxygen, air, oxygen-enriched air, etc.

The second contacting step of contacting the substrate having the catalytically effective metal thereon with a carbon source material is carried out at any suitable contacting conditions for an appropriate contacting time to grow carbon nanotubes on the substrate to a desired extent. The carbon source may constitute the catalytic metal-containing feedstock used in the first contacting step, or alternatively, the carbon source may comprise a catalytic metal-depleted form of such feedstock, as for example when the first contacting step and the second contacting step are conducted in series, using the same feedstock for both steps.

The second contacting step can be carried out at any suitable process conditions. For example, such contacting can be carried out in various implementations at temperature in a range of from 300 to 700° C., pressure in a range of from 1 to 200 psig, contacting time of 0.1 second to 10 minutes, and flow rates, compositions, etc., that are effective for growth of the carbon nanotubes. In one embodiment, the second contacting step is conducted at temperature in a range of from about 480 to about 550° C., and pressure in a range of 15 to 50 psig, with flow rates (represented as weight hourly space velocity, WHSV, the weight of oil in kg per weight of solid, in units of kg per hour) in a range of from 5 to 20 kg/hr for a contacting vessel in which the feedstock has a residence time in a range of from 0.5 to 144 seconds. Preferred residence time values in specific embodiments of the invention can be in a range of from about 0.5 to 10 seconds.

The second contacting step involving contact of the carbon source material with the metals-containing substrate can be advantageously carried out in a reactor operated as a fluidized bed reactor, through which the carbon source material is flowed as the fluidizing medium, at a sufficient superficial velocity to effect fluidization of the substrate (provided for such purpose as a bed of discontinuous particles), with minimum bypassing or other anomalous flow behavior.

The carbon source material may alternatively comprise a carbon source gas such as methane, ethane, butane, ethylene, acetylene, mixtures of $C_1$-$C_{20}$ hydrocarbons, etc., or any other suitable material, preferably in gaseous form, that is efficacious in contact with the catalytically effective metal-containing substrate under the appertaining process conditions for growing carbon nanotubes on the substrate.

Once the carbon nanotubes are grown on the catalytically augmented substrate, it remains to recover the carbon nanotubes.

One preferred technique for effecting such recovery is to effect shearing action on the carbon nanotubes on the substrate so that the carbon nanotubes are sheared off and may be recovered by suitable technique, e.g., filtration, gravitational separation, cycloning, etc.

As a further process variation in the method of the invention, it may be desirable in some implementations of the invention to re-utilize a substrate after recovery of carbon nanotubes therefrom, by recycling the substrate for contacting with the carbon source material and renewed growth of carbon nanotubes on the substrate.

Another approach that may be employed in the production of carbon nanotubes in accordance with the invention is continuous processing production. Although the production of carbon nanotubes in accordance with the invention preferably is conducted in a sequence of catalytic metal deposition and carbon source material contacting steps, the invention also contemplates processing in which a catalytic metal-containing carbon source material feedstock is employed to produce carbon nanotubes by continuous flow of feedstock while ramping temperature, in a single-step process. In this respect, it has been determined that nanotubes formation is catalyzed by nickel (0) crystallite and that in deposition of nickel from an organic phase/nickel porphyrin the nickel remains clear of carbon as determined by Auger spectroscopy analysis.

As another approach such recovery could be carried out with the use of a removable substrate on which the carbon nanotubes are grown, with the substrate thereafter being removable by solubilization, sublimation, melting, volatilization, and/or the like, to leave behind the carbon nanotubes in a collectable form, by suitable technique, e.g., filtration, gravitational separation, cycloning, etc.

For example, the removable substrate could be formed of a soluble material which after growth of the carbon nanotubes thereon is placed in a suitable solvent to dissolve the substrate material and leave the carbon nanotubes as a solid byproduct, which then can be filtered to recover the carbon nanotubes. Following drying to remove the solvent therefrom, the carbon nanotubes can be packaged or otherwise collected and provided for ultimate use, e.g., as a reinforcing material for high-strength nanomolecular composites, or for construction of nanotube-based integrated circuitry devices.

The invention also contemplates techniques for recovering the carbon nanotubes from the substrate on which they have formed, by use of differential thermal expansion/contraction effects, or energy impingement methods, to delaminate the nanotubes from the substrate. In general, any suitable approaches, equipment and/or methodology for recovery of the carbon nanotubes from the substrate can be employed.

Referring now to the drawings, FIG. 1 is a scanning electron microscope (SEM) micrograph showing carbon nanotubes as grown on calcined kaolin microspheres, prior to removal of the nanotubes from the microsphere substrate articles. The microspheres in the SEM micrograph have diameters of approximately 50-300 nanometers, and the nanotubes grown thereon have lengths in a range of from about 2 to about 6 microns. As is apparent from FIG. 1, the nanotubes were profusely generated on the surface of the microspheres.

Figure 2:
FIG. 2 is an SEM micrograph of greater magnification than the micrograph of FIG. 1, showing the detail of the formations of carbon nanotubes on the support medium.

FIG. 2 is a SEM micrograph of greater magnification than the micrograph of FIG. 1, showing the detail of the formations of carbon nanotubes on the substrate, as profusely generated on the substrate.

Figure 3:
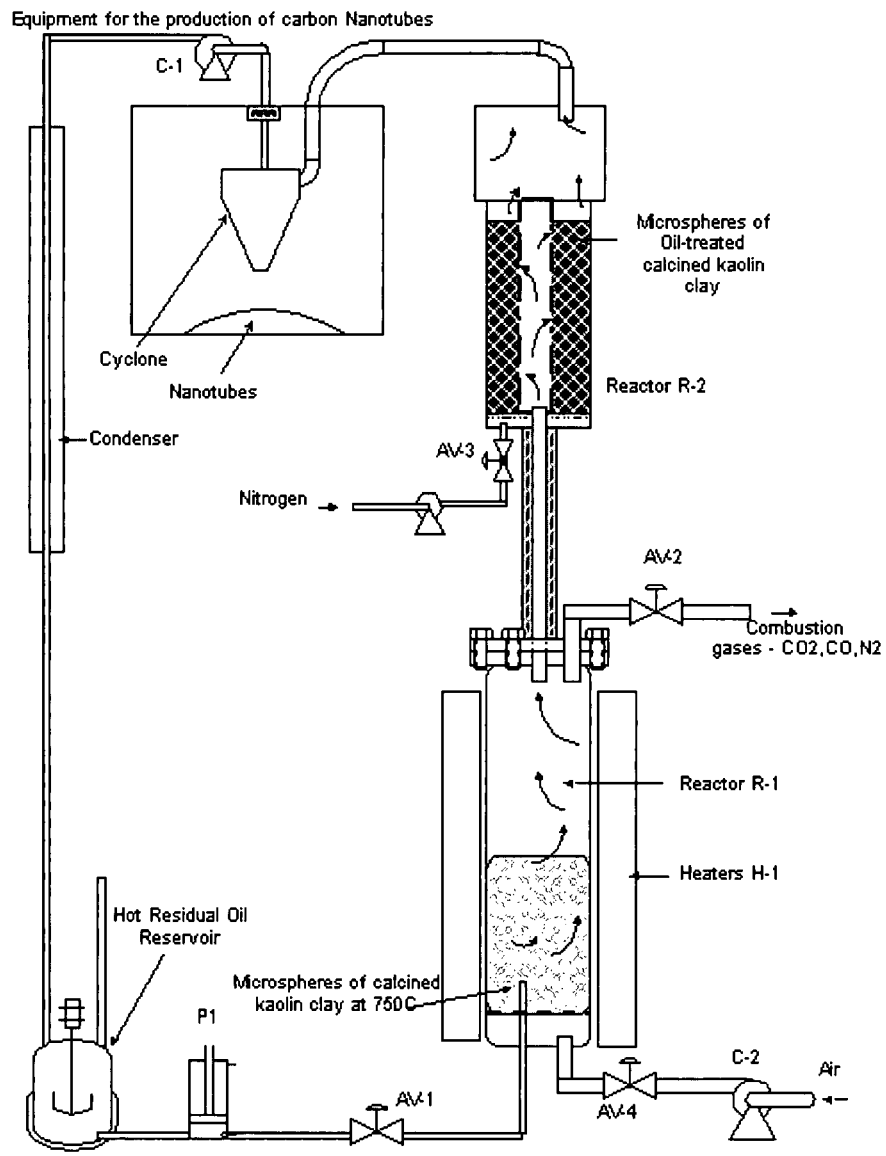
FIG. 3 is a schematic representation of a process system arrangement for synthesis of carbon nanotubes.

FIG. 3 is a schematic representation of an illustrative process system arrangement for synthesis of carbon nanotubes, in which microspheres of calcined kaolin are heated to 750° C. in fluidized bed reactor R-1 by heater H-1 jacketing the reactor.

In the fluidized bed reactor, the microspheres of calcined kaolin are fluidized by contact with hot residual oil-vapor pumped into the bed of particles from the hot oil reservoir (Hot Residual Oil Reservoir), through a feed line containing pump P-1 and valve AV-1, as illustrated. Cracking of the oil does not occur under these conditions but carbon (e.g., measured as Conradson carbon, determined by ASTM D189-01, Standard Test Method for Conradson Carbon Residue of Petroleum Products) and nickel porphyrins in the oil deposit on the kaolin particles. Conradson carbon is determined as the amount of carbon residue left after evaporation and pyrolysis of an oil, and provides an indication of relative coke-forming propensities of a particular oil; this test method is generally applied to relatively nonvolatile petroleum products that partially decompose on distillation at atmospheric pressure.

During the flow of hot residual oil through the bed of calcined kaolin particles, valve AV-4 in the air feed line is closed, and compressor C-2 in such line is off. The hot oil flowing through the fluidized bed reactor flashes off the particles and flows upwardly through the central tube between reactor R-1 and reactor R-2, into upper reactor R-2, in which the hot oil is contacted with microspheres that have previously experienced first stage processing in Reactor R-1. The flashed hot oil vapor then flows from reactor R-2 through the transfer line to the cyclone, with compressor C-1 being actuated to flow the hot oil vapor from the cyclone in the return line containing a condenser, to effect liquefaction of the hot oil vapor. The resulting hot liquid oil then is flowed in the return line to the hot residual oil reservoir.

Following metals deposition on the calcined kaolin microspheres in reactor R-1, the oil supply is terminated by closure of valve AV-1, and valve AV-4 is opened and compressor C-2 is turned on, to flow heated air into the reactor and achieve a carbon burn-off. The burn-off of carbon from the microspheres yields microspheres depleted in carbon, and retaining catalytic nickel deposited thereon. When the burn-off has been carried out to render the microspheres substantially carbon-free in character, the metal-containing microspheres are transferred to reactor R-2.

In reactor R-2, the unsaturated and aromatic molecules in the hot residual oil flowed through such reactor decompose in the presence of the nickel deposited on and within the microspheres, forming carbon nanotubes growing from the catalytically-assisted surfaces of the microspheres.

Flow of the hot residual oil then is discontinued through the second reactor R-2, the system is cooled, and the microspheres with their associated carbon nanotubes thereupon are fluidized by opening valve AV-3 in the nitrogen injection line containing a nitrogen compressor therein, and actuating the nitrogen compressor. By the resulting particle-particle interactions in the fluidized bed reactor R-2, the nanotubes break away from the microspheres and are entrained in the nitrogen fluidizing gas.

The carbon nanotubes-containing fluidizing gas exits the fluidized bed reactor R-2, and enters the upper plenum chamber of reactor R-2, from which it flows in a transfer line to the cyclone. In the cyclone, the carbon nanotubes are disengaged from the nitrogen fluidizing gas, and the resulting mechanically separated carbon nanotubes are collected for packaging and subsequent use.

The foregoing illustrative arrangement thus embodies a simple arrangement by which bulk production of carbon nanotubes can be achieved in a highly economic manner.

It will be recognized that the process of the invention may be widely varied in practice, as regards the specific process conditions, contacting zones, modes of contacting, substrate forms, mode of recovery of the carbon nanotubes from the substrate, and the like, as will be apparent to those of ordinary skill in the art, based on the disclosure herein. The invention therefore is susceptible of a wide variety of implementations, to produce carbon nanotubes of the desired character for the intended end use application.

In another aspect, the invention relates to a material based on single-wall carbon nanotubes (SWNTs) that are catalytically grown in pores of activated carbon (AC).

The present invention provides a novel combination of these two materials, AC and SWNTs, as a composite material that may variously be useful in a variety of end-use applications, including structural composites, electrically conductive structures, adsorbents, etc.

In the AC/SWNT composites, the SWNTs will fill up meso-and-micro pores of the activated carbon. In addition, the AC acts as a three-dimensional support for catalytic growth of SWNTs, allowing large scale production of SWNTs, in contrast to conventional approaches to carbon nanotube production that produce only small scale quantities of SWNTs.

The present invention therefore provides a novel SWNT/AC material that can be scaled up to mass production without major technological barriers, in contrast to conventional SWNT production techniques that produce only gram-quantities of SWNTs.

The manufacture of SWNT/AC composites in accordance with the invention, in one embodiment thereof, includes the steps of impregnating AC with a catalyst precursor that is reducible to fine metal catalyst particles, reducing the catalyst precursor to fine metal catalyst particles, catalytically growing carbon nanotubes in pores of the activated carbon, and optionally treating the composite to open the carbon nanotubes therein.

By such approach, large quantities of SWNT/AC composites can be manufactured. Such manufacture can be carried out in a suitable manner, e.g., in large fixed bed reactors. The composite synthesis method of the present invention takes advantage of the wide availability and low cost of AC as a raw material.

The SWNT/AC materials of the invention have the advantages that they are readily mass produced, and can be handled easily.

Figure 4:
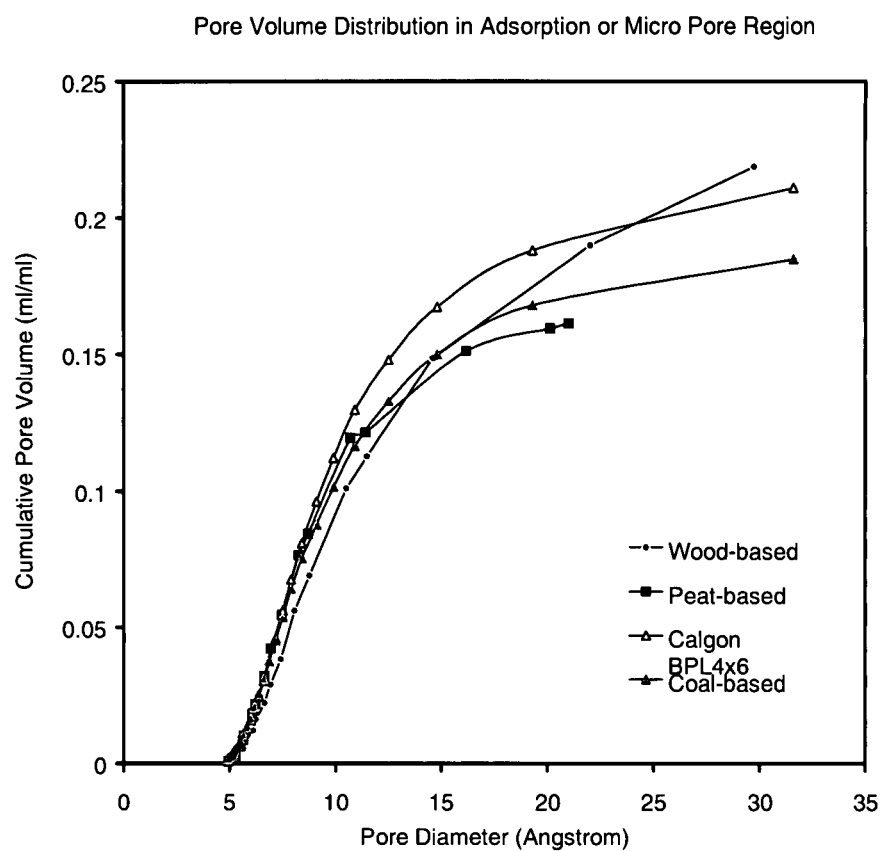
FIG. 4 is a graph of pore size distribution for various activated carbon materials in their micropore region, representing data derived from methane adsorption experiments, and plotted as cumulative pore volume in ml/ml, as a function of pore diameter, in Angstroms.
Figure 5:
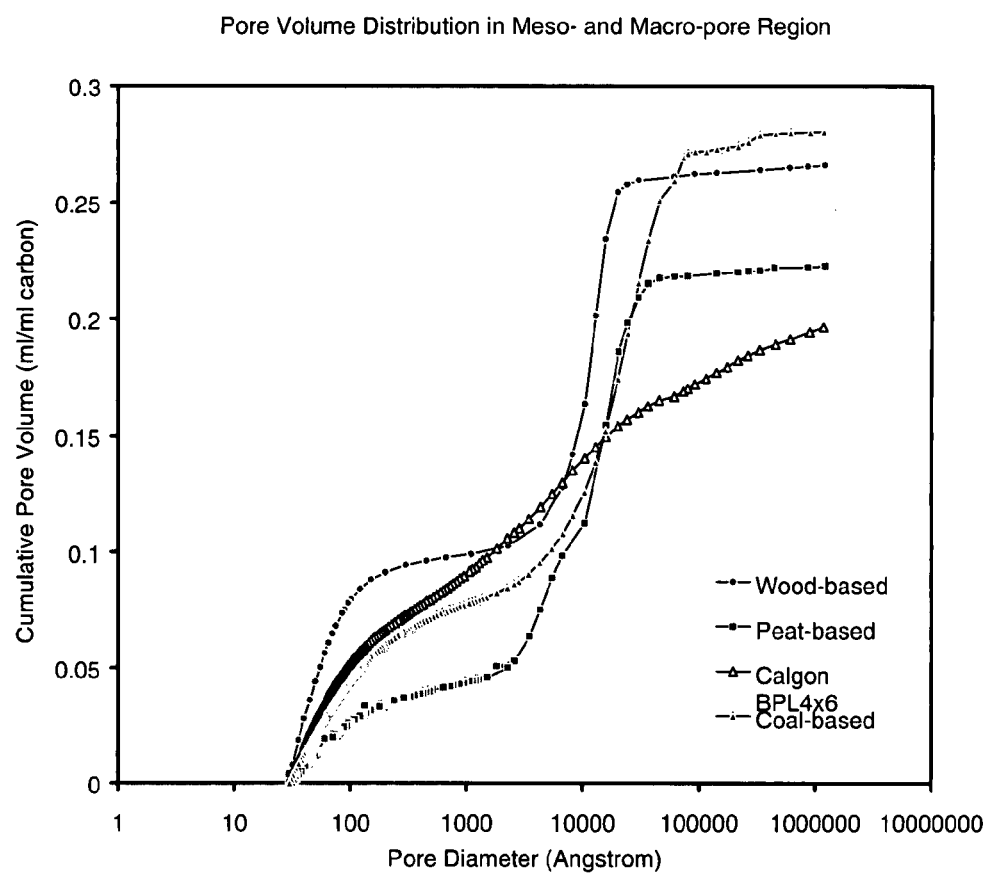
FIG. 5 is a graph of pore size distribution for various activated carbons, based on data obtained from mercury porosimetry experiments, with the data plotted as cumulative pore volume, in ml/ml carbon, as a function of pore diameter, in Angstroms, for pore volume in the meso-and-macro-pore region.

In activated carbon, the pore size distribution is typically highly populated at pore diameters >10 Angstroms, as shown in FIGS. 4 and 5 hereof. FIG. 4 is a graph of pore size distribution for various activated carbon materials in their micropore region, representing data derived from methane adsorption experiments, and plotted as cumulative pore volume in ml/ml, as a function of pore diameter, in Angstroms. Viewing the respective curves, at a pore diameter of 20 Å, the peat-based carbon (-□-) has a cumulative pore volume of about 0.16 ml/ml, the coal-based carbon (-▲-) has a cumulative pore volume of about 0.17 ml/ml, the wood-based carbon (-■-) has a cumulative pore volume of about 0.18 ml/ml, and a commercially available carbon (-Δ-), Calgon BPL4x6 (Calgon Carbon Corporation, Pittsburgh, Pa.) has a cumulative pore volume of about 0.19 ml/ml. FIG. 5 is a graph of pore size distribution for various activated carbons, based on data obtained from mercury porosimetry experiments, with the data plotted as cumulative pore volume, in ml/ml carbon, as a function of pore diameter, in Angstroms for pore volume in the meso-and-macro-pore region. Viewing the respective curves, at a pore diameter of 100,000 Å, the peat-based carbon (-□-) has a cumulative pore volume of about 0.22 ml/ml, the coal-based carbon (-▲-) has a cumulative pore volume of about 0.28 ml/ml, the wood-based carbon (-■-) has a cumulative pore volume of about 0.26 ml/ml, and a commercially available carbon (-Δ-), Calgon BPL4x6 (Calgon Carbon Corporation, Pittsburgh, Pa.) has a cumulative pore volume of about 0.17 ml/ml.

As shown by FIGS. 4 and 5, half of the pores in the carbon materials are greater than 1 micron in size.

In the SWNT/AC composite material of the present invention, the pore diameter of the SWNTs is provided in a desired size range, as controlled by the nanotube growth conditions.

In carbon nanotubes, the number of shells of the nanotube can vary from one, i.e., constituting a single-wall carbon nanotube (SWNT), to as many as 50 shells, each pair of adjacent shells in such structure having a spacing between layers that is on the order of ~0.34 nanometer. Carbon nanotubes (CNTs) are typically 1-50 nanometers in diameter and a few micrometers in length, although recently SWNTs have been grown to over 300 micrometers in length.

Figure 6:
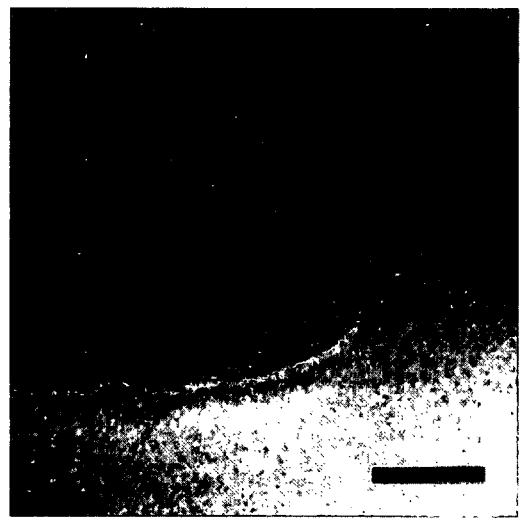
FIG. 6 is a tunneling electron micrograph image of a carbon nanotube with an open end, in which the micrograph has a scale bar of fifty Angstroms.

FIG. 6 is a tunneling electron micrograph of a carbon nanotube with an open end, in which the tip opening was formed by treatment of the nanotube with carbon dioxide. The scale bar shown in the lower right-hand portion of the micrograph represents a length of 50 Angstroms. The interior cylindrical-shaped volume of the nanotube is clearly visible in this micrograph.

Single-wall carbon nanotubes (SWNTs) represent a unique class of carbon nanotubes in that they contain only a single layer of graphite sheet. Such nanotubes can be formed in arc-evaporation processes using a small amount of transition-metal powder, such as cobalt, nickel or iron. The metal in such process serves as a catalyst to prevent the growing tubular structure from wrapping around and closing into a smaller fullerene cage. The presence of the metal catalyst also permits the growth process to be reduced in temperature. Single-walled nanotubes can be produced in yield proportions of more than 70%. These nanotubes self-organize into bundles—ropes more than $1/10^{th}$ of a millimeter in length.

Figure 7:
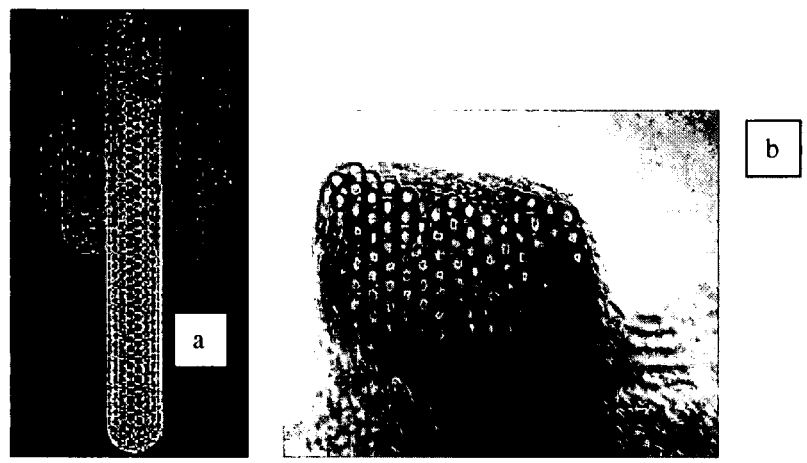
FIG. 7a is an artist's rendition of a single-wall carbon nanotube bundle.
FIG. 7b is a tunneling electron micrograph of a rope as it curves through the field of view.

FIG. 7a is an artist's rendition of a single-wall carbon nanotube bundle, and FIG. 7b is a tunneling electron microscope (TEM) micrograph of a carbon nanotube rope as it curves through the field of view.

The TEM view of FIG. 7b illustrates the highly uniform SWNT diameter characteristic of these ropes and the lattice constant of ~17 Angstroms. These ropes may be formed by any suitable formation techniques. For example, such SWNT articles can be formed by techniques in which a dual-laser beam is aimed at a block of graphite to vaporize same. Contact with a cooled copper collector causes the carbon atoms to be deposited in the form of nanotubes. The resulting nanotube "felt" then can be harvested, and SWNTs can be purified therefrom. The quantity of raw SWNT material containing 40-50% by volume of SWNTs is about 20 grams in a 48 hour continuous run (see A. G. Rinzler, et al., APPL. THYS. A 67, 27 (1998)).

Single-wall carbon nanotubes can also be produced by catalytic decomposition of stable gas-phase carbon-containing molecules on pre-formed catalyst particles at appropriate temperature. For example, a mixture of single-and-multi-walled nanotubes can be formed by decomposition of methane at a temperature of 1050° C. on an alumina-supported iron catalyst. In another technique SWTNs can be grown by disproportionation of carbon monoxide on alumina-supported molybdenum particles at 1200° C. A similar technique produces SWTNs by reaction at 850° C. under 900 torr pressure of carbon monoxide. When the catalyst used in such technique is a 34:1 alumina:molybdenum (mass proportions), an SWNT product can be made that is very monodisperse in diameter (having diameters of 8-9 Angstroms). Using a catalyst of 90:9:1 alumina:iron:molybdenum (mass proportions), nanotube products having a diameter distribution in a range of 5-30 Angstroms, constituted by mostly SWNTs and some double-wall nanotubes, can be produced. The use of diluted ethylene as a feed gas can be employed to produce SWNTs and double-walled nanotubes, in nanotube bundles with individual tubes in bundles ranging from 5 Angstroms to 30 Angstroms.

Although the foregoing SWNT production techniques have been developed, the quantities produced by such techniques are extremely small, and not practical for many commercial applications.

Figure 8:
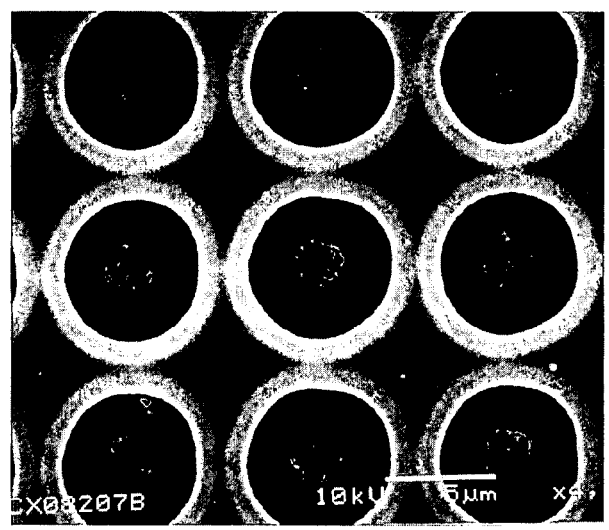
FIG. 8 is a scanning electron micrograph of a carbon nanotube-based field emission cathode, in which the carbon nanotubes are located in the center of the gate openings.

The technique described in Xu, et al. U.S. Pat. No. 5,872, 422 enables carbon nanotubes to be formed in a selective area of a device and utilized as electron emitters in field emission cathodes. FIG. 8 shows a scanning electron micrograph of a carbon nanotube-based field emission cathode, in which carbon nanotubes are formed in the center of the gate opening of each of the emitter regions.

Figure 9:
FIG. 9 is a scanning electron micrograph of carbon nanotube emitters in the field emission cathode.
Figure 10:
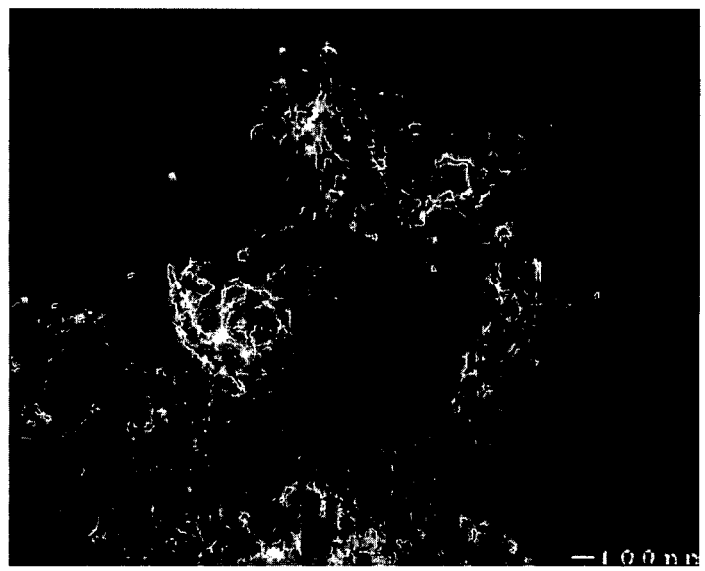
FIG. 10 is a scanning electron micrograph of single-walled carbon nanotube material showing a map of tangled 10 to 20 nanometer diameter carbon fibers, which are many micrometers long.

FIG. 9 shows a scanning electron micrograph of carbon nanotubes inside the cathode gate opening, in which the diameters of the carbon nanotubes are in a range of about 20-40 nanometers. For comparison, FIG. 10 shows a scanning electron micrograph of high-purity samples of SWNT consisting of a mat of randomly oriented SWNT fibers 10-20 nanometers in diameter and many micrometers in length.

Figure 11:
FIG. 11 is a tunneling electron micrograph of catalytically grown carbon nanotubes inside template-synthesized carbon tubules.

In accordance with one aspect of the present invention, SWNTs are formed inside of porous AC, by a catalytic growth process, utilizing a process of a general type as described more fully in G. H. Hafner, et al., Chem. Thys. Lett. 296, 195 (1998). The technique described in such article is modified in the application of the present invention, since the technique in Hafner, et al. employs growth on non-porous alumina substrates. FIG. 11 is a tunneling electron micrograph of iron-catalyzed carbon nanotubes of approximately 50 nanometers diameter within outer carbon tubules of approximately 200 nanometers that were formed by template-synthesis.

In accordance with a specific embodiment of the invention, SWNTs can be grown in the pores of AC by the following technique. Metal catalyst precursors, such as bis(acetylaceto-nato)-dioxomolybdenum (VI) or ferric nitrate, are dissolved in an appropriate solvent at a desired concentration. Porous catalyst support materials will subsequently be immersed in the solution and dried in air so that catalyst precursors will be resident in pores of the porous material, i.e., AC. The metal catalyst is reduced by heating in hydrogen or in an inert atmosphere, or under flowing reactant gases. Catalytic reaction will occur at elevated temperature in an atmosphere containing a carbon source, for a controlled amount of time.

After the reaction has been completed, the porous catalyst material can be weighed to determine total amount of carbon deposition. The as-grown material then can be treated to remove the residual catalyst and to open the tips of the nanotubes.

While activated carbon (AC) is described herein as an illustrative and preferred porous material within which SWNTs are grown, the invention is not thus limited, and SWNTs can be grown in accordance with the invention in other porous media, to provide composites of widely varying composition that are useful as adsorbent storage media. Examples of other porous materials include silica, silicon, porous glasses, porous ceramics, etc.

The foregoing process of forming SWNTs in porous media takes advantage of the fact that growth of the SWNTs is favored when the rate-limiting step of nanotube growth is changed from carbon diffusion through the catalytic particle to carbon supply to the catalytic carbon. As a result, the invention contemplates scale-up to large fixed-bed reactors as resulting in less efficient supply of reactants to the catalyst particles, to increase the yield of SWNTs. The growth of SWNTs in the pores of the AC will also be favored due to the reduced supply of reactants in the pores. The growth of SWNTs in larger pores of activated carbon increases the total volume of micropores while decreasing the volume of meso-and-macropores.

Catalysts potentially useful in the practice of the invention, in various embodiments thereof, include, without limitation, iron, nickel, cobalt and other less active transition metals. Examples in specific embodiments include nickel, cobalt, iron, molybdenum, and molybdenum:iron bimetallic catalysts. The catalyst and catalyst particle size have strong influence on the SWNTs grown in the process, with a clear correspondence between catalyst particle size and tube diameters of the catalytically grown SWNTs. Catalyst particles formed on surfaces of pores of porous material can have very small diameter when the initial catalyst precursor loading in the pores is controlled and the nucleation and formation of particles is limited within each pore.

In general, SWNT growth conditions are chosen that provide a desired selectivity and yield. Growth conditions preferably entail a minimum occurrence of pyrolysis, such as by choice of molecules with low propensity to pyrolysis, e.g., carbon monoxide or highly dilute hydrocarbon sources. The growth conditions suitable for such a purpose in a given application may be readily determined within the skill of the art based on the disclosure herein.

Figure 12:
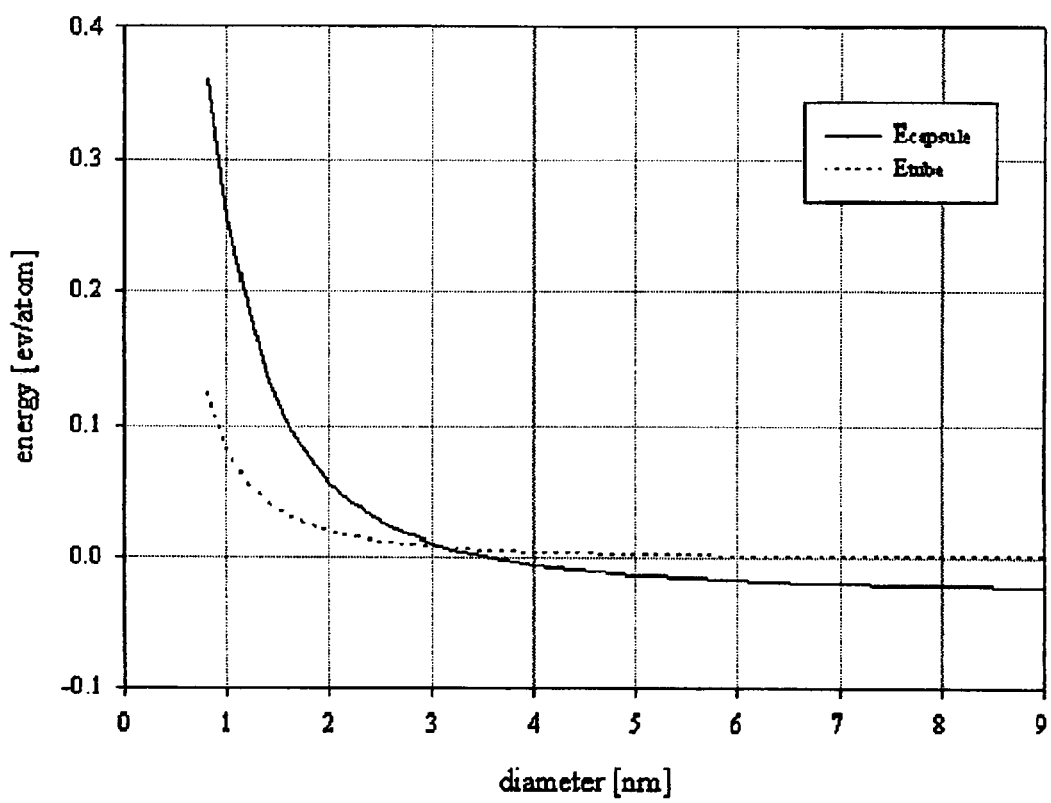
FIG. 12 is a graph of energies of single-wall carbon nanotubes and carbon overcoats in relation to an infinite graphene sheet as a function of particle size, in nanometers. Energy is set out in units of electron volts per atom.

In general, SWNTs selectivity can be increased by use of very small catalyst particles. FIG. 12 shows the energies of carbon nanotubes and graphene overcoating on the catalyst particle as a function of particle size. When the particle size is less than three nanometers, the nanotube has lower energy than the carbon overcoat, and when the particle is larger than 3 nanometers, the carbon overcoat has lower energy than the nanotube. Accordingly, by judicious selection of a growth condition in which the reaction rate-limiting step is supply of surface carbon on the catalyst particle, more time is available for the growing system to achieve the lowest energy structure, so that smaller particles produce nanotubes while larger particles are encapsulated by carbon.

Accordingly, the conditions for selective growth of SWNTs include (i) minimal pyrolysis of the carbon source, (ii) uniformly small catalyst particles (iii) moderate activity of the catalyst so that smaller particles are active while larger particles are not, and (iv) reaction-limiting step being the deposition of surface carbon rather than diffusion of carbon.

By way of example, carbon monoxide may be used as a carbon source for the growth of SWNTs in the pores of AC. Carbon monoxide disproportionates on the catalyst surface to form carbon and carbon dioxide, with no decomposition on other surfaces at a reaction pressure of approximately 1 atmosphere. The rate-limiting step will be carbon monoxide decomposition, allowing favorable formation of SWNTs. Molybdenum is a preferred catalyst, since it is moderately active and suppresses the growth of multi-walled nanotubes. Iron is also highly preferred in the practice of the invention. After the growth has been concluded, the carbon nanotubes have both ends capped. Acid solutions then can be used to remove the metal catalyst and to open the tips of the nanotubes.

SWNT/carbon composites formed in accordance with the foregoing techniques, containing SWNTs in porosity of the carbon, may variously be useful in a variety of end-use applications, including structural composites, electrically conductive structures, nanoelectronic devices, adsorbents, etc.

Figure 13:
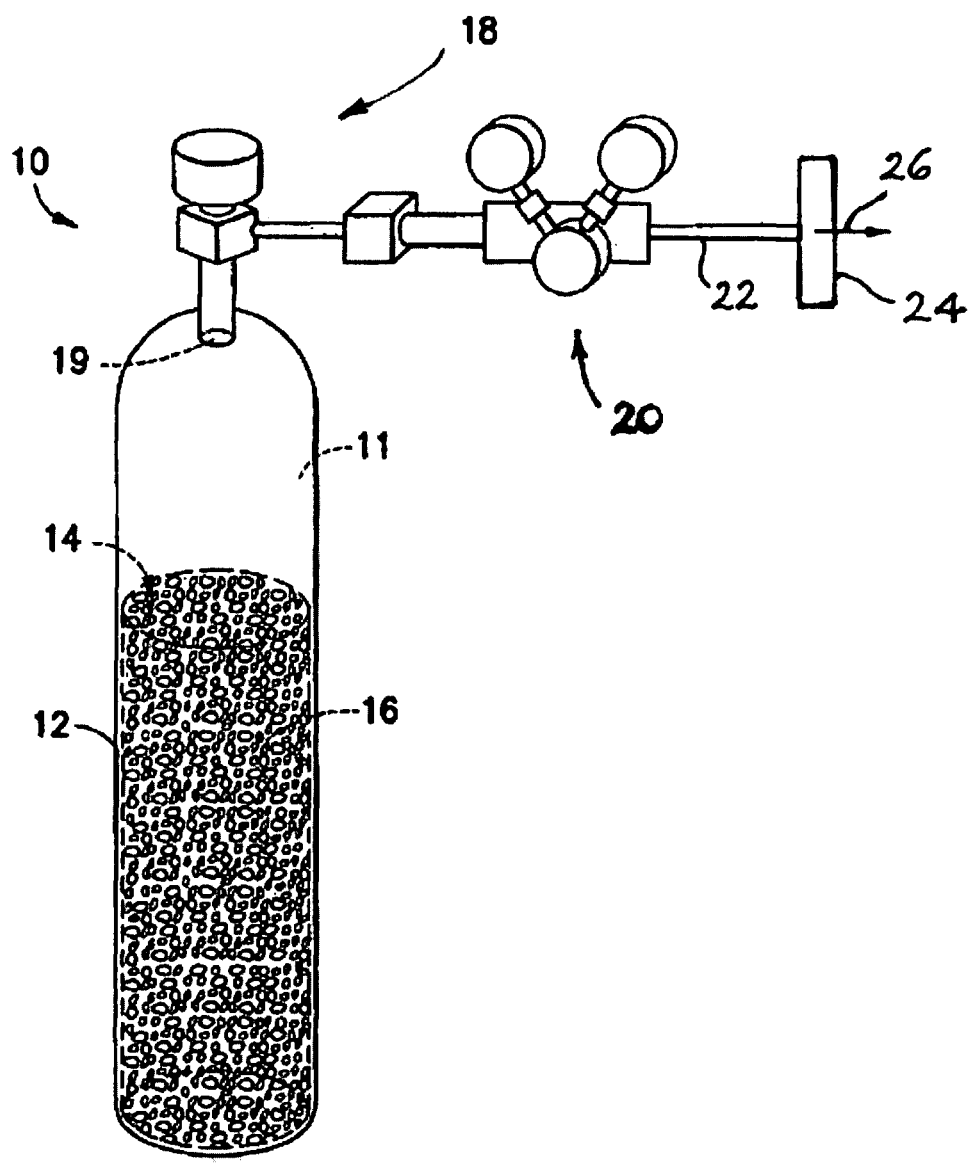
FIG. 13 is a perspective schematic view of a fluid storage and dispensing system according to one embodiment of the present invention, in which carbon nanotubes/activated carbon composite material is utilized as a fluid storage medium.

FIG. 13 is a schematic representation of a fluid storage and dispensing system 10 comprising storage and dispensing vessel 12, wherein the SWNT/carbon composite material of the invention is employed as a fluid storage and dispensing medium, e.g., for a gas for which the carbon has sorptive affinity and from which the gas can be desorbed under dispensing conditions, e.g., by pressure differential, heating of the sorptive composite material and/or flow of a carrier gas through the interior volume of the vessel to impose a concentration gradient effecting release of the stored gas from the sorptive composite medium. Gases that may be amenable to such storage and dispensing, as sorbate fluids, include, without limitation, arsine, phosphine, boron trifluoride, germanium tetrafluoride, hydrogen selenide, phosphorus trifluoride, arsenic pentafluoride and silicon tetrafluoride.

The storage and dispensing vessel 12 may for example comprise a conventional gas cylinder container of elongate character, or other vessel of desired size, shape and structural characteristics. In the interior volume of such vessel is disposed a bed 14 of the SWNT/AC composite material 16 of the present invention, as a sorbent medium.

The vessel 12 is provided at its upper end with a conventional cylinder head fluid dispensing assembly 18 coupled with the main body of the vessel 12 at the port 19. Port 19 allows flow of gas from the interior volume 11 of the vessel to the dispensing assembly 18. To prevent entrainment of particulate solids in the fluid being dispensed from the vessel, the port 19 may be provided with a frit or other filter or solids-retention element therein.

The vessel 12 therefore retains the sorbate fluid on the adsorbent in bed 14, and the fluid is desorbed from the adsorbent and dispensed from the vessel under dispensing conditions, e.g., by pressure differential-mediated desorption. Such pressure differential may be established by flow communication between the vessel, on the one hand, and the exterior dispensing environment or locus of use of the dispensed fluid on the other. The vessel dispensing assembly may be coupled with downstream flow circuitry containing the pressure regulator 20 as shown in FIG. 13, and/or other flow control and monitoring components such as restricted flow orifice elements, mass flow controllers, pressure transducers, flow control valves, etc. in the flow circuitry. As illustrated, the flow circuitry conduit is coupled to a downstream fluid-using unit 24, which may be of any suitable type, depending on the character and type of the fluid being dispensed. The byproduct gases from the fluid utilization in the fluid-using unit 24 may be discharged from the unit 24 from the exhaust line 26.

The dispensing assembly 18 of the vessel and the flow circuitry including conduit 22 may be associated with pumps, blowers, fans, eductors, ejectors or other motive driver for flowing fluid from the vessel 12 to the unit 24.

The bed 14 of SWNT/AC adsorbent may be charged to the vessel in any suitable volume. The bed may be overlaid in the vessel by a headspace, to allow disengagement of the desorbed fluid from the bed, and to avoid entrainment of solids in the fluid flowed through port 19 and dispensing assembly 18 to the flow circuitry conduit 22.

Apart from such use of the SWNT/porous material matrix of the invention as a storage medium for fluids, such composite matrix material of the invention may be employed in various applications, including those previously discussed herein, as well as in other applications, such as use as a nano-filtration material, chemical protectant medium, or composite material in other implementations in which single-walled nanotube elements in a porous matrix have benefit.

Accordingly, while the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A method of forming carbon nanotubes, comprising:
   depositing one or more carbon compounds on a substrate, wherein the one or more carbon compounds comprise a catalytically effective metal;
   combusting the one or more carbon compounds under oxidizing conditions to produce a catalytically effective metal-containing substrate; and
   contacting a carbon source material with the catalytically effective metal-containing substrate under sufficient growth conditions to grow carbon nanotubes on the substrate;
   wherein the carbon compound comprises a petroleum feedstock, a residual oil feedstock, or an oil refining atmospheric tower residue.

2. The method of claim 1, wherein the catalytically effective metal comprises nickel or iron, and the carbon source material comprises a hydrocarbon material.

3. The method of claim 1, wherein the carbon source material comprises a petroleum feedstock, a residual oil feedstock, or an oil refining atmospheric tower residue.

4. The method of claim 1, wherein said petroleum feedstock, said residual oil feedstock, or said oil refining atmospheric tower residue comprises nickel porphyrins.

5. The method of claim 2 wherein said hydrocarbon material comprises at least one unsaturated hydrocarbon.

6. The method of claim 5 wherein said at least one unsaturated hydrocarbon is volatilizable into hydrocarbon vapor so as to facilitate contact with said catalytically effective metal.

7. The method of claim 5 wherein said at least one unsaturated hydrocarbon is selected from the group consisting of alkenes, alkynes, cycloalkenes, cycloalkynes, aryls, arylalkyls, and alkaryls.

8. The method of claim 3 wherein said petroleum feedstock, said residual oil feedstock, or said oil refining atmospheric tower residue contains nickel porphyrins.

9. The method of claim 4, wherein said nickel porphyrins exhibit nickel concentrations within the range of approximately one part per million by weight (ppm wt.) to approximately 100 parts per million by weight (ppm wt.).

10. The method of claim 4, wherein said nickel porphyrins exhibit nickel concentrations greater than 100 parts per million by weight (ppm wt.).

11. The method of claim 1, wherein said petroleum feedstock, said residual oil feedstock, or said oil refining atmospheric tower residue contains iron at concentrations within the range of approximately one part per million by weight (ppm wt.) to approximately 50 parts per million by weight (ppm wt.).

12. The method of claim 1 wherein said substrate is composed of a material selected from the group consisting of silica, alumina, aluminosilicates, kielselguhr, clays, and macroreticulate polymer.

13. The method of claim 1 wherein said substrate is formed of finely divided microparticles.

14. The method of claim 13 wherein said finely divided microparticles are microspheres, microflakes, or microrods.

15. The method of claim 1 wherein said substrate comprises an inert silica-alumina matrix of calcined kaolin mircospheres.

16. The method of claim 1 wherein the one or more carbon compounds are deposited on the substrate at a temperature within the range of 480° C. to 750° C.

17. The method of claim 1 wherein the one or more carbon compounds are deposited on the substrate at a temperature within the range of 510° C. to 710° C.

18. The method of claim 1 wherein the one or more carbon compounds are deposited on the substrate at a temperature within the range of 520° C. to 650° C.

19. The method of claim 1 wherein the one or more carbon compounds are deposited on the substrate at a temperature within the range of 526° C. to 620° C.

20. The method of claim 1 wherein the one or more carbon compounds are deposited on the substrate at a pressure within the range of 15 psig to 50 psig.

21. The method of claim 1 wherein the one or more carbon compounds are deposited on the substrate at a flow rate within the range of 5 kg/hour to 20 kg/hour.

22. The method of claim 1, wherein the same material is used as the one or more carbon compounds comprising a catalytically effective metal and the carbon source material.

23. The method of claim 1, wherein combusting the one or more carbon compounds under oxidizing conditions comprises contacting the substrate with an oxidant gas.

24. The method of claim 23, wherein the one or more carbon compounds are oxidized at a temperature within a range of 550° C. and 870° C.

25. The method of claim 23, wherein the oxidant gas comprises one or more members selected from the group consisting of carbon monoxide, carbon dioxide, oxygen, air, and oxygen-enriched air.

26. The method of 1, wherein sufficient growth conditions comprise temperature within a range of 300° C. and 700° C., pressure within a range of 1 and 200 pounds-force per square inch gauge (psig), and contacting time within a range of 0.1 second to 10 minutes.

* * * * *